United States Patent [19]

Chung

[11] Patent Number: 4,995,057
[45] Date of Patent: Feb. 19, 1991

[54] TECHNIQUE FOR ACHIEVING THE THEORETICAL CODING GAIN OF DIGITAL SIGNALS INCORPORATING ERROR CORRECTION

[75] Inventor: Hong Y. Chung, Eatontown, N.J.

[73] Assignee: AT&T Bell Laboratories, Murray Hill, N.J.

[21] Appl. No.: 304,051

[22] Filed: Jan. 30, 1989

Related U.S. Application Data

[63] Continuation-in-part of Ser. No. 266,435, Nov. 2, 1988, abandoned.

[51] Int. Cl.⁵ ............................................. H03H 7/30
[52] U.S. Cl. ...................................... 375/13; 333/18; 375/109
[58] Field of Search ..................... 375/7, 8, 12, 13, 14, 375/17, 96; 333/18, 28 R; 364/724; 370/69.1; 340/825.08

[56] References Cited

U.S. PATENT DOCUMENTS

| | | | |
|---|---|---|---|
| 3,593,142 | 7/1971 | Freeny | 375/109 |
| 4,053,837 | 10/1977 | Ryan et al. | 375/15 |
| 4,385,381 | 5/1983 | Alexis | 370/69.1 |
| 4,433,425 | 2/1984 | De Jaeger | 375/13 |
| 4,483,009 | 11/1984 | Honda et al. | 375/14 |
| 4,489,416 | 12/1984 | Stuart | 375/13 |
| 4,550,415 | 10/1985 | Debus, Jr. et al. | 375/14 |
| 4,797,898 | 1/1989 | Martinez | 375/7 |

FOREIGN PATENT DOCUMENTS

0180066  5/1986  European Pat. Off. .............. 375/13

Primary Examiner—Douglas W. Olms
Assistant Examiner—Stephen Chin
Attorney, Agent, or Firm—David R. Padnes

[57] ABSTRACT

The theoretical coding gain associated with an error correction technique can be realized in a digital communications system employing this error correction by providing the equalization in the transmitter instead of the receiver. In a first embodiment, an automatic equalizer in the receiver of a digital communications system is adjusted using a training sequence. The equalizer coefficients for optimum adjustment are then transmitted back to the transmitter and supplied to an equalizer therein. After the training period is over, this transmitter equalizer, now having optimum coefficients, is activated and the receiver equalizer is disabled. In a second embodiment, the use of a training sequence can be eliminated and the receiver equalizer can be adjusted in response to actual data using "blind" equalization. The generated coefficients, as in the first embodiment, are then transmitted back to the transmitter. In either embodiment, using the transmitter equalizer to predistort the transmitted signal in a manner opposite to that of the communications medium connecting the transmitter and receiver assures that the noise at the input to the receiver decoder is both Gaussian and white. As a result, the theoretical coding gain associated with the employed error correction is substantially realized.

29 Claims, 4 Drawing Sheets

TECHNIQUE FOR ACHIEVING THE THEORETICAL CODING GAIN OF DIGITAL SIGNALS INCORPORATING ERROR CORRECTION

This application is a continuation-in-part of application Ser. No. 266,435, filed on Nov. 2, 1988, and now being abandoned as of the filing date hereof.

TECHNICAL FIELD

The present invention relates to digital communications and, more particularly, to a technique which permits the theoretical coding gain associated with any error correction technique to be substantially realizable.

BACKGROUND OF THE INVENTION

Communication system can be classified as either multi-point or point-to-point. In the latter, any given transmitter/receiver unit can only communicate with one other transmitter/receiver unit, while in the former, a central transmitter/receiver unit can communicate with a plurality of other transmitter/receiver units. Communication systems can also be differentiated based on the information flow. In unidirectional systems, the information only flows from a transmitter at one location to a receiver at another location. Alarm or monitoring systems are examples of such unidirectional systems. Bidirectional communications systems, on the other hand, send information back and forth between two or more locations at communication rates which may or may not be the same in each direction. Regardless of such classifications, there are a myriad of different coding schemes used to prepare the information signal for transmission through a medium. To increase the probability of accurately recovering the information signal in a receiver unit, many coding schemes utilize distortion compensation apparatus and/or error correction.

Equalizers are one class of devices used in communications systems to compensate for the distortion in a communications channel. Equalizers fall into two broad categories: fixed and adjustable. In a fixed equalizer, the average electrical characteristics of the communications channel are determined and a fixed amount of equalization is then designed into the equalizer which compensates for the distortion characteristics of an average channel. In an adjustable equalizer, the channel is monitored and the equalization provided in the equalizer is varied so as to provide that necessary to match the distortion characteristic present at the time of monitoring. Such monitoring may be done when customer-controlled information symbols are transmitted and the equalizer is continually adjusted after one or more symbols are received. In such case, the adjustable equalizer is called an adaptive equalizer. If the adjustment of the equalizer is provided in response to the transmission of a known symbol sequence, called a training sequence, which is transmitted at predetermined, substantially separated time intervals, the adjustable equalizer is called an automatic equalizer.

Error correction can be provided by either block or convolutional coding. In block coding, one or more error correction bits are transmitted along with a "block" of one or more information bits. Each of these error correction bits has a value which is determined by the value of the information bit or bits in the associated block. This process of transmitting error correction bits is also utilized in convolutional coding but unlike block coding, the value of each error correction bit in convolutional coding is a function of the information bits in the associated block and some predetermined number of previously transmitted blocks.

Coding gain is a term which refers to the increased performance of a system resulting from the use of error correction. It is defends as the amount by which the signal-to-noise ratio may deteriorate for a system utilizing error correction before the bit error rate for this system equals that of the same system without error correction. This term can be calculated analytically for any system and for purposes herein the resulting analytically derived quantity is referred to as the theoretical coding gain.

In actual systems using error correction, it has long been observed that there is a substantial difference between the theoretical coding gain and that determined from actual measurements. For example, in some voice-band transmission systems, the theoretical coding gain may be 3 to 4 dB while the measured coding gain is only 1 to 2 dB. This difference can degrade performance below systems objectives and is especially troublesome is high-speed transmission systems. Prior art techniques to correct this shortcoming have focused on the use of apparatus in the transmitter which reorders the sequence of symbols that would ordinarily be transmitted. In the receiver, apparatus is also added which restores the original symbol sequence. While this technique has provided satisfactory results in certain applications, it is unsuited for many others as it adds considerable delay to the signal transmission and, of course, adds considerable circuit complexity to both the receiver and transmitter. Moreover, the added delay and circuitry complexity becomes progressively worse with increasing levels of distortion. As a result, the utility of the prior art technique is severely circumscribed. Therefore, it would be extremely desirable if a technique could be developed which permits the theoretical coding gain associated with error correction to be realizable in an actual system regardless of the degree of channel distortion. It would be especially beneficial if this could be provided without adding significant complexity to either the transmitter or receiver circuitry.

SUMMARY OF THE INVENTION

The present invention increases the coding gain realizable for any block or convolutional error correction technique used in a digital communications system. In one aspect of the present invention, this increase in coding gain is achieved through the use of transmitter equalization in a point-to-point digital communications system. In another aspect of the invention, the increase in coding gain is accomplished through the use of transmitter equalization in a multi-point communications system for communications from a central location to any of a plurality of remote locations.

More specifically, pursuant to one embodiment of the present invention, a training sequence is used to determine the optimum adjustment for an equalizer in the receiver of the communications system. This communications system incorporates a predetermined error correction technique and includes a transmitter and a receiver at two or more locations with the transmitter and receiver at different locations being interconnected via a communications medium.

Once the optimum equalizer adjustment is determined, the equalizer in the receiver is deactivated and the optimum adjustment for the receiver equalizer is transmitted to an equalizer in the transmitter at the other end of the communications medium. This transmitter equalizer is then used to predistort the signal to be transmitted in a manner opposite to that introduced by the medium.

In another embodiment of the present invention, the use of a training sequence can be eliminated and an equalizer in the receiver is adjusted using "blind" equalization. As in the first embodiment, the generated equalizer coefficients are then coupled back to a transmitter equalizer which, like in the first embodiment, predistorts the signal to be transmitted.

In either embodiment, the swapping of the equalization function from the receiver to the transmitter assures that the noise at the input to the receiver decoder is both Gaussian and white. As a result, the theoretical coding gain associated with the applied error correction is substantially realized. Advantageously, this technique is applicable to both bidirectional and unidirectional communications systems arranged in either point-to-point or multi-point configurations.

DETAILED DESCRIPTION

Figure 1:
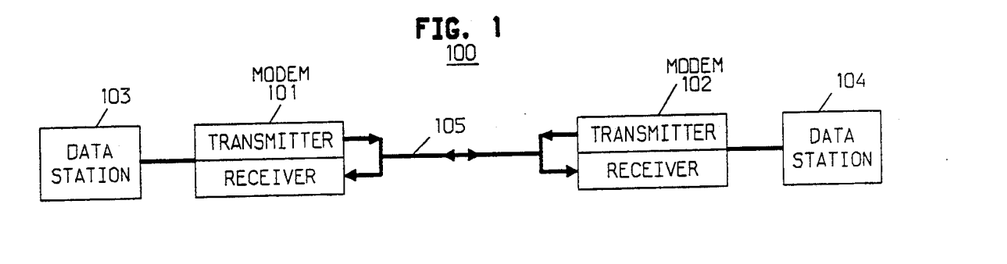
FIG. 1 is a simplified representation of a point-to-point digital communications system for use with the present invention.

In FIG. 1, point-to-point digital communication system 100 includes modems 101 and 102 which respectively interconnect data stations 103 and 104 via communications medium 105. The term digital, for purposes of this application, refers to the notion that the information communicated in system 100 is carried on discrete levels. Medium 105 can take forms, such as wire, the atmosphere, optical fiber, etc. While system 100 can be unidirectional, for purposes of illustration, system 100 is assumed to be bidirectional and each data station has the capability of generating and receiving digital information. Each data station can take many forms. For example, any data station may be a date entry terminal or a video display unit or a remote data acquisition device, etc. Modems 101 and 102 serve to prepare the digital information for transmission through medium 105 using well-known techniques. Each modem also includes an equalizer and a coder/decoder which utilizes error correction (both not shown). These devices significantly improve the likelihood of recovering the transmitted information at the receiver despite the presence of distortion.

Figure 2:
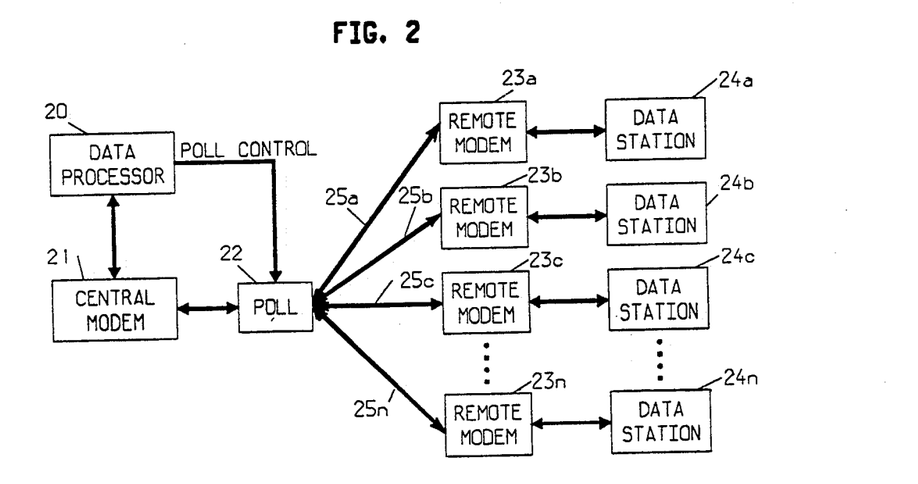
FIG. 2 is a simplified representation of a multi-point digital communications system for use with the present invention.

FIG. 2 shows an illustrative multi-point digital communications system wherein a data processor 20 is connected to data stations 24a–24n via central modem 21 and remote modems 23a14 23n. Each of the remote modems is respectively associated with one of the data stations. Such data stations can take any of the forms previously described with respect to FIG. 1. Again, as with FIG. 1, each modem serves to prepare the information for transmission through media 25a–25n. Each of the media 25a14 25n, as was the case for FIG. 1, may take different forms and the media may be similar to one another or may be different.

The signals transmitted from the remote modems over their respective communications medium are applied to a polling device 22 which is connected to central modem 21. The polling device periodically scans each of media 25a–25n to see if an incoming signal is present. If a signal is present, the polling device will lock onto the signal and couple it to central modem 21. When transmission is complete, the polling device will recommence its scanning of the media until another incoming signal is detected. If it is desired to send a signal from the central modem to a particular remote modem, the polling device is given the address of the desired remote modem and selects the appropriate medium connected thereto. The operation of the polling device can be controlled by a logic sequencing unit or processor incorporated within the polling device, or can be controlled externally, as shown in FIG. 2, by data processor 20.

As will be recognized, in a polled modem arrangement where the data stations are connected over communications media, the transfer characteristic of each medium can vary with time and can vary from one medium to another. This is especially true when the different media are part of a telephone network. In such a network, each time communications are established, the electrical characteristics of the communications path interconnecting one modem to another are likely to be different than those previously encountered. In order to obviate the distortion and degrading characteristics of these communications paths and to optimize data transmission thereover, it is necessary that some adjustment be performed in order to correct or compensate for such distortion. To this end, each modem in FIG. 2 also includes an equalizer and a coder/decoder which utilizes error correction (both not shown).

As will be described more fully hereinbelow, in one disclosed embodiment, equalization in point-to-point or multi-point digital systems utilizing error correction is provided through the use of automatic equalizers in the transmitter of each modem. Moreover, unlike the prior art, this use of a transmitter equalizer is used for either one or both directions of a point-to-point system and for communications from a central location to one or more remote locations in a multi-point system. Each of these equalizers is adjusted through the use of a training sequence, i.e., the transmission of predetermined symbols from one modem to another during preselected time periods. During such periods, the equalizer in the transmitter is deactivated and an equalizer in the modem receiving the training sequence is adjusted for optimum recovery of the training sequence symbols. This optimum adjustment of the receiver equalizer is then communicated to the transmitter and used to adjust the equalizer therein. After the training period, the equalizer in the receiving equalizer is deactivated and equalization is provided by the transmitter equalizer. At the heart of the present invention is the realization that this swapping of the equalization function from the receiver to the transmitter assures that the noise at the input to the receiver decoder is both Gaussian and white. As a result, the theoretical coding gain associated with the error correction utilized in the system is substantially realized. This same benefit can be attained in another embodiment of the invention wherein the same procedure is followed except that a training sequence is not used to adjust the receiver equalizer. Instead, this equalizer is adjusted using blind equalization, i.e., the equalizer is adjusted in response to received signals whose values are not known in advance.

Figure 3:
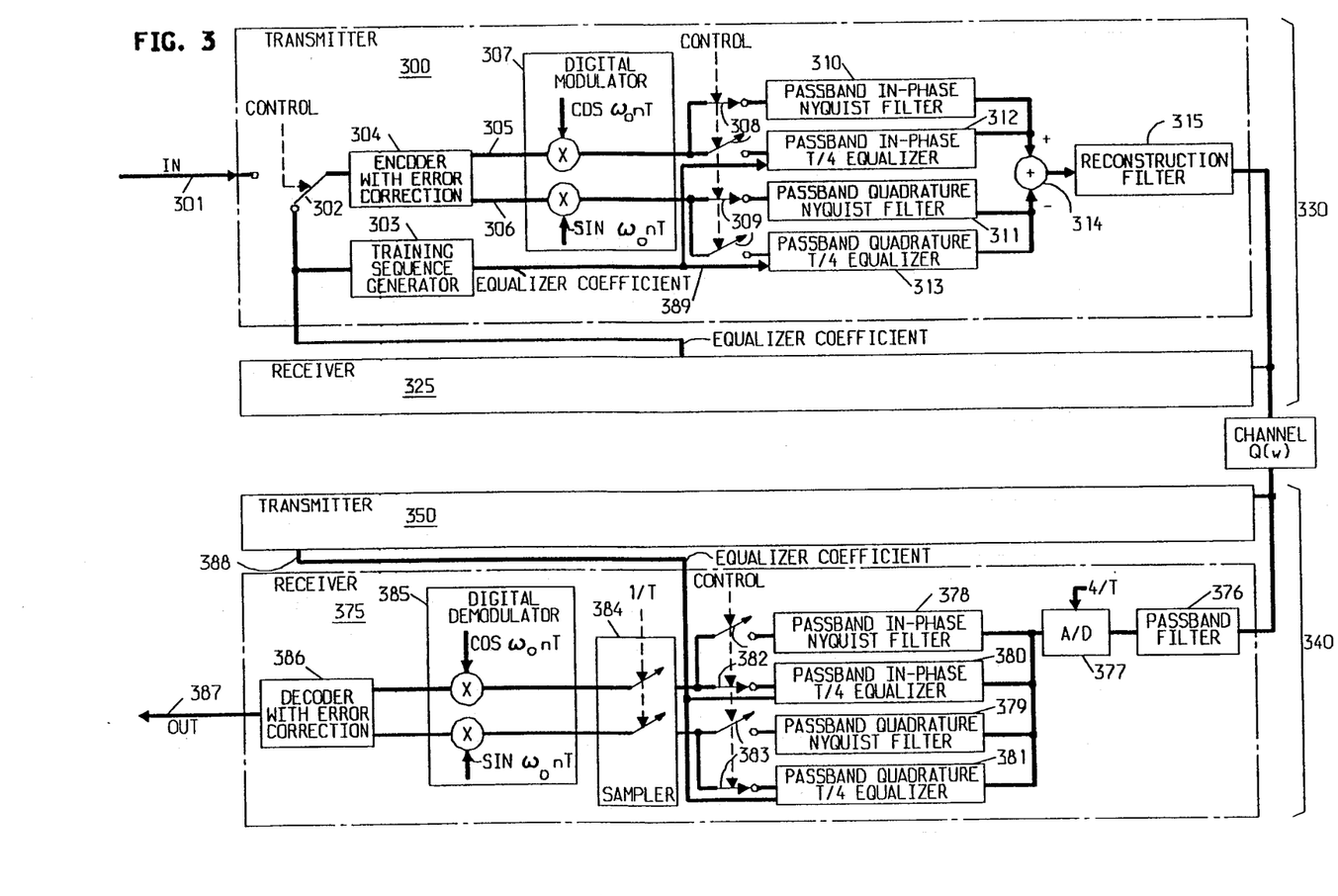
FIG. 3 is a block-schematic representation of an embodiment of a transmitter and receiver structure, pursuant to the present invention, for use within the systems of FIGS. 1 or 2.

Refer now to FIG. 3 which illustrates circuitry to provide equalization swapping from the receiver of one modem to the transmitter of another. For illustrative purposes, it will be assumed that the modems in FIGS. 1 and 2 utilize quadrature amplitude modulation and passband equalization provided by automatic equalizers. Any other digital modulation format, e.g., pulse code modulation, pulse amplitude modulation, phase shift keying, etc., can, of course, be used with the present invention.

FIG. 3 shows two modems 330 and 340 which respectively include identical transmitters 300 and 350 and identical receivers 325 and 375. Transmitter 300 of modem 330 is supplied with binary information from either lead 301 or training sequence generator 303 via switch 302. During a training period, switch 301, operated in response to a control signal which indicates a training period, couples binary signals forming the predetermined training sequence from training sequence generator 303. The training sequence is typically repeated some number of times or is repeated until the equalizer at the receiver is optimally adjusted. Either of these procedures is well-known in the art and need not be described in detail. At other times, witch 302 couples the binary signals on lead 301 to encoder 304.

The binary signals coupled by switch 302 are supplied to encoder 304 which incorporates error correction. Encoder 304, which may be realized in many different forms, provides a predetermined block or convolutional error correction technique to improve the reliability of recovering the transmitted information at a receiver. A myriad of such error correction techniques are known. One commonly used technique is known as trellis coding. In any event, regardless of the particular error correction technique utilized and whether the input signal is from lead 301 or training sequence generator 303, encoder 304 provides a pair of coded outputs on leads 305 and 306, respectively known as the in-phase coded and the quadrature coded component signals. These coded component signals are formed in response to consecutive groups of K bits, where K is an integer. If it is assumed that K=4, and the bit rate is 9600 bits/second, then a new group of bits or symbols is accepted 9600/4 or 2400 times per second. The number of times per second that symbols are formed is known as the baud rate and the reciprocal of the baud rate, designated herein as T, is known as the baud duration or baud interval. With is architecture, the coded component signals can take on only a discrete set of amplitudes which only change at times nT, where n is an integer representing the baud interval index.

Modulator 307 multiples the in-phase and quadrature coded component signals respectively by cos $\omega_0 nT$ and $-\sin \omega_0 nT$. Such multiplication is advantageously performed digitally and the products formed are coupled through double-pole switches 308 and 309. Switches 308 and 309 are operated in response to the same control signal which controls switch 302. During the training sequence period, the switches direct the modulated in-phase and quadrature component signals to passband Nyquist filters 310 and 311, respectively. These filters spectrally shape such component signals in a well-known manner which minimizes interference between successive modulated symbols. At other times, switches 308 and 309 direct the modulated in-phase and quadrature coded component signals to passband T/4 linear equalizers 312 and 313. The T/4 term designates that each equalizer is a fractionally-spaced equalizer which operates on 4 modulated samples per baud interval. As encoder 305 only provides one symbol sample to each equalizer per baud interval, each equalizer advantageously stuffs three 0s, in well-known fashion, after every received modulated symbol samples so as to form 4 samples per baud interval. Use of a T/4 equalizer advantageously simplifies the equalization structure as it eliminates the need for an additional two equalizers, two summers and two Hilbert transform filters. This additional circuitry is needed to compensate for interference in each coded component signal caused by the other coded component signal. Other fractionally-spaced equalizers which satisfy the Nyquist sampling theory can also be used. Alternatively, of course, a crosscoupled structure using T/2 fractionally-spaced equalizers could be used.

Summer 314 combines the outputs of filters 310 and 311 or equalizers 312 and 313, as indicated, to form a digital representation of a QAM signal. This representation is passed through reconstruction filter 315 which includes an A/D converter to form a continuous QAM waveform and a low-pass filter to pass the modulated signal spectrum. The output signal is then supplied to a communications medium, illustratively represented as a box having a transfer characteristic Q(t).

After passing through the communications medium, the modulated signal is filtered by passband filter 376 and converted into a digital signal by A/D converter 377. Converter 377 is clocked at 4 times the baud rate. The digital signals thus formed are coupled through either Nyquist filters 378 and 379 or passband T/4 linear equalizer 380 and 381. Double-pole switches 382 and 383, whose operation is controlled in the same manner as switches 302, 308 and 309, determine whether the incoming signals pass through the pair of equalizers or the pair of Nyquist filters. During the training period, the incoming signals are coupled through equalizers 380 and 381 and the Nyquist filters 378 and 379 are bypassed. Equalizers 380 and 381 respectively reduce the noise and distortion in the in-phase and quadrature component signals within the received signal and, as was the case for the transmitter equalizers, operate on symbols at 4 times the baud rate. At times other than a training period, the received signal is shaped by Nyquist filters 378 and 379, as equalization is provided in the transmitter.

Sampler 384, synchronized to the baud rate, provides digital signal samples to digital demodulator 385 and excludes the stuffed equalized samples which follow every symbol samples encoded from the binary data coupled from lead 301 or training sequence generator 303. These samples are multiplied by cos $\omega_0 nT$ and $-\sin \omega nT$ within digital demodulator 385 to recover the in-phase and quadrature coded component signals. Decoder 386, which incorporates the same error correction technique used in encoder 304, receives the coded component signals and recovers the original binary input encoded by transmitter 300. This recovered input appears on lead 387.

It will be noted that, in the described embodiment, the adjustable equalizers in the transmitters and receivers are each automatic equalizers and as such are adjustable to a optimum setting for a particular communications medium. Each setting is characterized by specifying the tap-weight coefficient values of each equalizer and these values can be adjusted to reflect changes in the transfer characteristics of the communications medium with time. Such adjustment is accomplished by transmitting another training sequence at a later time, and readjusting the receiver equalizers so as to optimally recover the training sequence symbols.

As stated in this described embodiment, the receiver equalizers are adjusted to an optimum setting in response to the a priori known training symbols. It should now be apparent that, once each optimum equalizer adjustment is determined, it must be coupled back to the equalizer in the transmitter of the communicating modem so that the swapping of equalization from the receiver of one modem to the transmitter of another modem can be accomplished without affecting system performance. This procedure in also known and will only be summarized. As shown in FIG. 3, for example, the optimum coefficient values for each equalizer in receiver 375 are coupled via bus 388 to transmitter 350 of modem 340. The equalizer coefficient values are then retransmitted back to receiver 325 in modem 330 and thence to equalizers 312 and 313 in transmitter 300 via buses 388 and 389. This process may also be performed in the other direction of a bidirectional communications system so that the coefficient values determined for the equalizer in receiver 325 can be transmitted back to transmitter 350. The communications medium through which the equalizer coefficients are coupled back to the transmitter can be the same medium through which the digital signals were originally transmitted to the receiver or can be a completely different medium. Some examples of such different mediums in a communications system might be twisted pair and coaxial cable, twisted pair or coaxial cable and radio, or coaxial cable or twisted pair and optical fiber.

The determination of the equalizer coefficients as described above is independently made for each transmission direction. As a result, the transfer characteristics of the communications medium may be different for each transmission direction. The transmitter of each modem is identical and each includes a training sequence generator. Of course, this duplication of training sequence generators in each modem can be eliminated by utilizing one training sequence to adjust the equalizers for two directions of transmission. In this approach, the training symbols are transmitted from a first to a second modem. In the second modem, the training symbols are used to adjust the equalizers therein. Then, once these equalizers are adjusted and the training symbols are recovered, they are "looped back" to the transmitter of the second modem and transmitted back to the receiver of the first modem. With this loop back, the training symbols used for adjusting the equalizers in the second modem can be "reused" for adjusting the equalizers in the first modem. Accordingly, the need for a training sequence generator in each transmitter is eliminated.

Reviewing the signal processing described thus far, it will be seen that equalization is provided in the receiver during the training period and Nyquist filtering is provided within the transmitter. At other times, the location of the equalization and Nyquist filtering are reversed, i.e., equalization is provided in the transmitter and Nyquist filtering is provided in the receiver. While, as stated, hereinabove, the swapping of the equalization function from the receiver to the transmitter assures that the noise at the inputs to decoder 386 is both Gaussian and white and, as a result, the theoretical coding gain can be realized, the swapping of the Nyquist filtering from the transmitter to receiver appears extraneous. As will be discussed, however, the simultaneous swapping of equalization and Nyquist filtering advantageously allows result of a single hardware structure for both equalization and Nyquist filtering. Therefore, the simultaneous swapping of equalization and Nyquist filtering is desirable as it reduces circuit complexity and cost.

Figure 4:
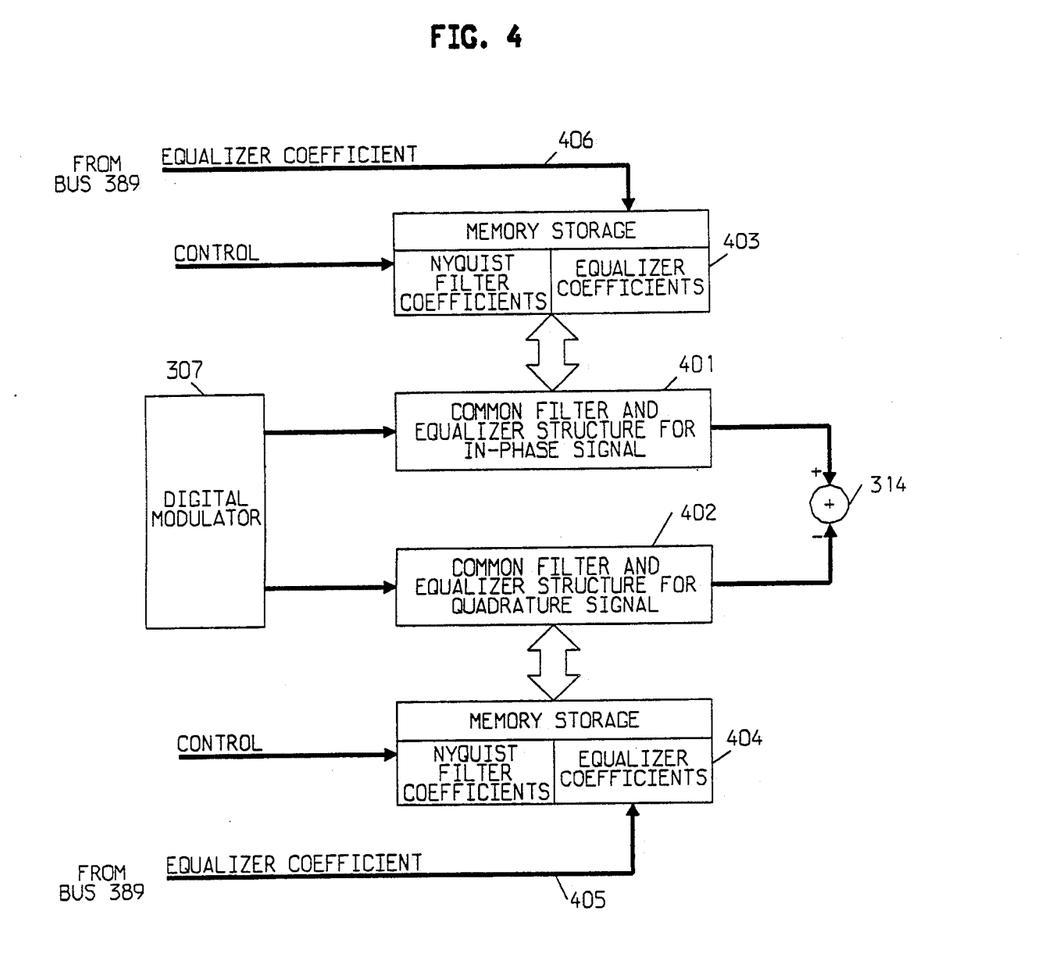
FIG. 4 is a block-schematic diagram of an embodiment of a memory-based filter and equalizer structure for use with the present invention.

While FIG. 3 has shown mechanical switches as the elements which determine whether the signals pass through the Nyquist filters or passband equalizers in the transmitter and receiver of a modem, this combination of equalizers, Nyquist filters and switches can be replaced by another equivalent structure. At the onset, a Nyquist filter and passband equalizer can be digitally implemented by a common structure and the equalization or Nyquist filtering can be provided by this structure by specifying appropriate coefficients to provide the desired filtering or equalization. FIG. 4 shows one such illustrative arrangement which includes common filter and equalizer structures 401 and 402 and memories 403 and 404. Operation within the transmitter will be described first. In response to the control signal, which was used to control switch operation in FIG. 3 and indicates the training period, the Nyquist filter coefficients are read out of memories 403 and 404 and supplied to structures 401 and 402. At times other than a training period, the equalizer coefficients are read out of memories 403 and 404 and supplied to structures 401 and 402. The optimum coefficient values are supplied to memories 403 and 404 via bus 389. Structures 401 and 402 and memories 403 and 404 can also be disposed within the receiver of a modem between sampler 384 and A/D converter 377. In this application, updating of the coefficient values into the memory via leads 405 and 406 is not required and the reading out of equalizer and Nyquist filter coefficients is opposite to that described for transmitter operation.

Figure 5:
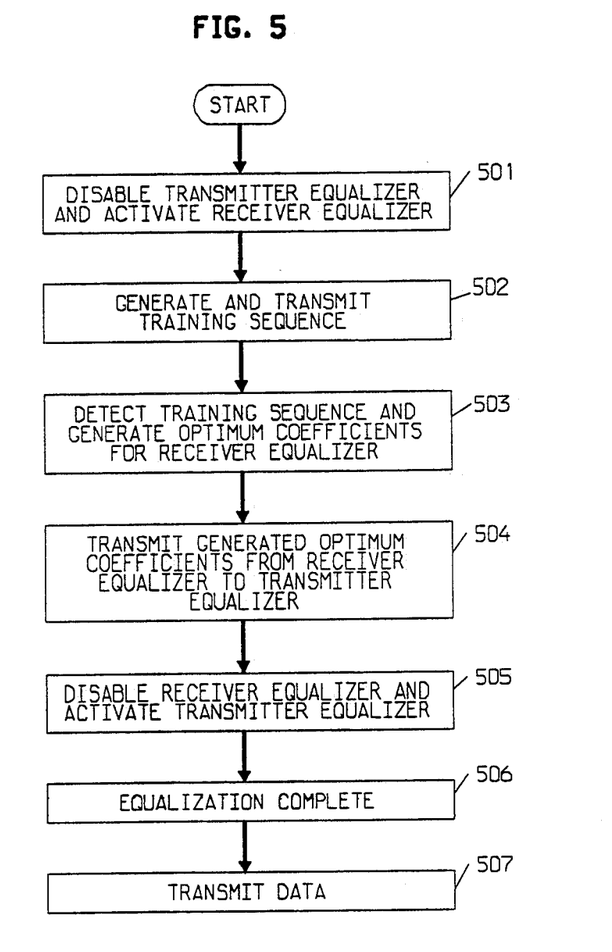
FIG. 5 is a flow chart which shows the steps of providing equalization in accordance with the present invention.

The sequence of operations for achieving the theoretical coding gain of a point-to-point digital communications is summarized in FIG. 5. After the equalization swapping is completed, as shown by step 506, nontraining data is transmitted. For a multi-point communications system, steps 501 through 504 are repeated for each communications link interfacing the central modem, assuming that theoretical coding gain is desired for each such link. If so, the central modem would have to store the optimum equalizer coefficients for each communications link, and the coefficients associated with a particular link would have to be read out each time there was a transmission through this link. Alternatively, a separate equalizer could be used for transmission through each of the plurality of communications links interfacing the central modem.

Another envisioned embodiment of the present invention incorporates the same apparatus and procedure as shown in FIGS. 3 and 4 except that the use of a training sequence and, hence, training sequence generator 303 and switch 302 can be eliminated. Instead of using a training sequence including a priori known symbols, the receiver equalized can be adjusted in response to data signals on lead 301 whose values are not a priori known. This process is well-known and is called blind equalization. The use of blind equalization as compared to the use of a training sequence may require a longer time interval for the receiver equalizer to converge to the optimum coefficient values. Indeed, if there is some distortion in the communications path, the equalizer coefficient could fail to converge or could converge to the wrong values. However, blind equalization can operate satisfactorily in the appropriate system application.

It should, of course, be understood that while the present invention has been described in terms of illustrative embodiments, alternative arrangements should be apparent to those of ordinary skill in the art. First, for example, while the illustrative embodiments are embedded within modems, the present invention is applicable for use with any digital communications system utilizing error correction. What the information represents is, of course, irrelevant and the digital information, for example, could represent voice, data, video, facsimile and the like. Second, the invention is applicable to unidirectional or bidirectional communications systems. Moreover, in a bidirectional communications system, the swapping of equalization from the receiver to the transmitter can be done for each direction of transmission or could be done for only one direction. The latter could arise, for example, when the speed of transmission or the system requirements in a first direction are lower than for a second direction and, therefore, realization of the theoretical coding gain may not be necessary for transmission in the first direction. Third, while swapping of passband equalization from the receiver to the transmitter has been shown, the invention is also applicable to the swapping of a baseland equalizer from the receiver to the transmitter. In addition, since the optimum coefficients for a baseland equalizer can be converted to those for a passband equalizer and vice versa, the swapping of equalization from the receiver to the transmitter is applicable regardless of whether the equalizers in the transmitter and receiver are of the baseband or passband variety or a combination of both. Of course, it is generally preferable from a circuit standpoint if both equalizers are of the same type, i.e., passband or baseband. Fourth, while a digital implementation of the transmitter and receiver has been described, the invention concept is also applicable to either digital or analog transmitter and receiver implementations, each using one or more equalizers depending on the modulation format. Finally, while the equalizer coefficients in the disclosed embodiment are sent over the same communications medium used for the customer information, such coefficients could be coupled from the receiver equalizer to the transmitter equalizer over another medium or a secondary channel of the same medium used for customer information.

We claim:

1. A point-to-point communications system which transmits digital signals from a first location to only one second location via a communications medium having varying transmission characteristics, said system comprising
a first adjustable equalizer at said first location for compensating for amplitude and phase distortion in said medium,
a second adjustable equalizer at said second location for compensating for amplitude and phase distortion in said medium,
means, responsive to digital signals received at said second location, for generating equalization coefficients for said second equalizer which are suitable for compensating for said amplitude and phase distortion, and for transmitting said generated equalization coefficients from said second location to said first equalizer
a first Nyquist filter at said first location,
a second Nyquist filter at said second location, and
control means for assuring that only one of said first and second equalizers and only one of said first and second Nyquist filters is operative at any time.

2. The system of claim 1 wherein said transmitting means transmits said equalization coefficients to said first equalizer via said communications medium.

3. The system of claim 1 wherein said transmitting means transmits said equalization coefficients to said first equalizer via a second communications medium.

4. The system of claim 1 further including
means for generating a training sequence and transmitting said training sequence from said first location to said second locations, and
wherein the received digital signals to which said generating means is response is said training sequence.

5. The system of claim 4 further including
means for recovering said training sequence at said second location and transmitting said training sequence from said second location to said first location, and
means, responsive to said training sequence recovered at said first location, for generating equalization coefficients for a third adjustable equalizer at said first location which are suitable for compensating for said varying transmission characteristics, and transmitting these generated equalization coefficients from said first location to a fourth adjustable equalizer at said second location.

6. The apparatus of claim 1 further including
an encoder incorporating error correction connected to said equalizer at said first location, and
a decoder incorporating said error correction connected to said equalizer at said second location.

7. The system of claim 4 wherein said training sequence is transmitted at at least one predetermined time and said control means assures that said second equalizer is operative and said first equalizer is inoperative at each said predetermined time.

8. The system of claim 7 wherein said control means assures that said first equalizer is operative and said second equalizer is inoperative at times other than each said predetermined time.

9. The system of claim 8 further including
a Nyquist filter at said first location,
a Nyquist filter at said second location, and
second control means for assuring that said Nyquist filter at said first location is operative and said Nyquist at said second location is inoperative at each said predetermined time and for assuring that said Nyquist filter at said second location is operative and said Nyquist filter at said first location is inoperative at times other than each said predetermined time.

10. The system of claim 1 wherein digital signals are also transmitted from said second location to said first location and said system further including
means, responsive to digital signals received at said first location, for generating equalization coefficients for a third adjustable equalizer at said first location which are suitable for compensating for distortion in the received digital signals, and transmitting these generated equalization coefficients from said first location to a fourth adjustable equalizer at said second location.

11. The system of claim 10 wherein said transmitting means transmits said equalization coefficients to said fourth equalizer via said communications medium.

12. The system of claim 10 wherein said transmitting means transmits said equalization coefficients to said fourth equalizer via a second communications medium.

13. The system of claim 10 further including
means for generating a second training sequence and transmitting said second training sequence from said second location to said first location, and
wherein the received digital signals to which said third equalizer coefficient generating means is response to said second training sequence.

14. A method of realizing the theoretical coding gain associated with an error correction technique used in a point-to-point communications system, said system transmitting a digital signal from a first location to only one second location via a communications medium having varying transmission characteristics, said method comprising the steps of
generating equalization coefficients for a first adjustable equalizer at said first location in response to received digital signals therein which are suitable for compensating for amplitude and phase distortion in said medium,
generating equalization coefficients for a second adjustable equalizer at said second location in response to received digital signals therein which are suitable for compensating for amplitude and phase distortion in said medium,
transmitting said generated equalization coefficients from said first location to said second location, and
transmitting said generated equalization coefficients from said second location to said first location.

15. A multi-point communications system of the type wherein digital signals at a central location are transmitted to a plurality of remote locations via separate communications paths each having varying transmission characteristics, said system comprising
an adjustable equalizer at one remote location for compensating for amplitude and phase distorting in an associated one of the communications paths,
an adjustable equalizer at said central location for compensating for amplitude and phase distortion in said associated one of the communications paths, and
means, responsive to digital signals received at said one remote location, for generating equalization coefficients for said adjustable equalizer at said one remote location which are suitable for compensating for said amplitude and phase distortion in said associated one of the communications paths, and transmitting these generated equalization coefficients from said one remote location to said equalizer at said central location.

16. The system of claim 15 further including
means for generating a training sequence and transmitting said sequence from said central location to said one remote location, and
wherein the received digital signals to which said generating means is responsive is said training sequence.

17. The system of claim 15 further including
control means for assuring that either said equalizer at said one remote location or said equalizer at said central location is operative upon the digital signal at any time.

18. The system and claim 17 wherein the received digital signals include a training sequence, said training sequence being transmitted at at least one predetermined time and said control means assures that said equalizer at said one remote location is operative and said equalizer at said central location is inoperative at each said predetermined time.

19. The system of claim 18 wherein said control means assures that said equalizer at said central location is operative and said equalizer at said one remote location is inoperative at times other than each said predetermined time.

20. The system of claim 19 further including
a Nyquist filter at said one remote location,
a Nyquist filter at said central location, and
second control means for assuring that said Nyquist filter at said central location is operative and said Nyquist filter at said one remote location is inoperative at each predetermined time and for assuring that said Nyquist filter at said one remote location is operative and said Nyquist filter at said central location is inoperative at times other than each said predetermined time.

21. The system of claim 15 wherein digital signals are also transmitted from said one remote location to said central location and said system further including
means, responsive to digital signals received at said central location, for generating equalization coefficients for a third adjustable equalizer at said central location which are suitable for compensating for distortion in the digital signals received at said central location, and transmitting these equalization coefficients from said central location to a fourth adjustable equalizer at said one remote location.

22. The system of claim 21 further including
means for generating a second training sequence and transmitting second training sequence from said one remote location to said central location, and
wherein the received digital signals to which said third equalizer coefficient generating means is responsive is said second training sequence.

23. The communications system of claim 21 wherein said equalization coefficients are transmitted to said one remote location via said communications medium.

24. The communications system of claim 21 wherein said equalization coefficients are transmitted to said one remote location via a second communications medium.

25. The system of claim 16 further including
means for recovering said training sequence at said one remote location and transmitting said training sequence back to said central location, and
means, responsive to said training sequence received at said central location, for generating equalization coefficients for a third adjustable equalizer at said central location which are suitable for distorting compensation, and transmitting said generated equalization coefficients from said central location to a fourth adjustable equalizer at said one remote location.

26. The system of claim 15 further including
an encoder, incorporating error correction, connected to said equalizer at said central location, and a decoder, incorporating error correction, connected to said equalizer at said one remote location.

27. A method of realizing the theoretical coding gain associated with an error correction technique used in a point-to-point communications system, said system transmitting a digital signal from a first location to only one second location via a communications medium having varying transmission characteristics, said method comprising the steps of generating equalization coefficients for an adjustable equalizer at said second location in response to received digital signals therein which are suitable for compensating for amplitude and phase distortion in said medium, and transmitting said generated equalization coefficients from said second location to an adjustable equalizer at said first location, and controlling the operation of the equalizers at said first and second locations and first and second Nyquist filters respectively disposed at said first and second locations so that only one of the equalizers and one of the Nyquist filters is activated at any time.

28. A method of realizing the theoretical coding gain associated with an error correction technique used in a multi-point communications system, said system being of the type wherein a digital signal at a central location is transmitted to a plurality of remote locations via separate communications paths each having varying transmission characteristics, said method comprising the steps of:

generating equalization coefficients for an adjustable equalizer at said one remote location in response to received digital signals therein which are suitable for compensating for amplitude and phase distortion in an associated one of said communications paths, and transmitting said generated equalization coefficients from said one remote location to a second adjustable equalizer at said central location, said transmitted equalization coefficients being used by said second adjustable equalizer for compensating for said amplitude and phase distortion in communications from said central location to said one remote location.

29. A point-to-point digital communications system which transmits digital signals from a first location to only one second location via a communications medium having varying transmission characteristics, said system comprising a first adjustable equalizer at said first location for compensating for amplitude and phase distortion in said medium, a second adjustable equalizer at said second location for compensating for amplitude and phase distortion in said medium, means, responsive to digital signals received at said first location, for generating equalization coefficients for said equalizer which are suitable for compensating for said amplitude and phase distortion, and for transmitting said generated equalization coefficients from said first location to said second location, said transmitted equalization coefficients being used at said second location for compensating for said amplitude and phase distortion in signal transmission from said second to said first location, and means, responsive to digital signals received at said second location, for generating equalization coefficients for said second equalizer which are suitable for compensating for said amplitude and phase distortion, and for transmitting said generated equalization coefficients from said second location to said first location, said transmitted equalization coefficients being used at said first location for compensating for said amplitude and phase distortion in signal transmission from said first to said second location.

* * * * *

UNITED STATES PATENT AND TRADEMARK OFFICE
CERTIFICATE OF CORRECTION

PATENT NO. : 4,995,057

DATED : February 19, 1991

INVENTOR(S) : Hong Y. Chung

It is certified that error appears in the above-identified patent and that said Letters Patent is hereby corrected as shown below:

Title page, item [54], "Hong Y. Chung" should read --Hong Yang Chung-- and add --Jin-Der Wang, Eatontown, N.J.--.

Col. 1, line 18, "system" should read --systems--

Col. 2, line 7, "defends" should read --defined--    line 23, "is" should read --in--

Col. 3, line 54, "date" should read --data--    line 67, "23a14 23n" should read --23a-23n--

Col. 4, line 5, "25a14 25n" should read --25a-25n--

Col. 5, line 32, "witch" should read --switch--    line 56, "is" should read --this--

Col. 6, line 10, "305" should read --304--    line 13, "samples" should read --sample--    line 41, "equalizer" should read --equalizers--
line 59, "samples" should read --sample--    line 62, "ωnT" should read --$\omega_0 nT$--

UNITED STATES PATENT AND TRADEMARK OFFICE
CERTIFICATE OF CORRECTION

PATENT NO. : 4,995,057

DATED : February 19, 1991

INVENTOR(S) : Hong Y. Chung

It is certified that error appears in the above-identified patent and that said Letters Patent is hereby corrected as shown below:

Col. 8, line 11, "result" should read --reuse--   line 68, "equalized" should read --equalizer--

Col. 9, line 35, "baseland" should read --baseband--   line 37, "baseland" should read --baseband--

Col. 10, line 22, "locations" should read --location--

Col. 11, lines 18 and 19, "response to" should read --responsive is--
    line 47, "distorting" should read --distortion--

Col 12, line 6, "and" should read --of--
    line 61, "distorting" should read --distortion--

UNITED STATES PATENT AND TRADEMARK OFFICE
CERTIFICATE OF CORRECTION

PATENT NO. : 4,995,057

DATED : February 19, 1991

INVENTOR(S) : Hong Y. Chung

It is certified that error appears in the above-identified patent and that said Letters Patent is hereby corrected as shown below:

Col. 14, line 19, "said" should read --said first--

Signed and Sealed this

Thirtieth Day of March, 1993

Attest:

STEPHEN G. KUNIN

Attesting Officer

Acting Commissioner of Patents and Trademarks